(12) United States Patent
Shiohara (10) Patent No.: US 10,834,323 B2
(45) Date of Patent: Nov. 10, 2020

(54) ELECTRONIC APPARATUS, MOTION SENSOR, POSITION CHANGE DETECTION PROGRAM, AND POSITION CHANGE DETECTION METHOD

(71) Applicant: SEIKO EPSON CORPORATION, Tokyo (JP)

(72) Inventor: Ryuichi Shiohara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 26 days.

(21) Appl. No.: 16/130,439

(22) Filed: Sep. 13, 2018

(65) Prior Publication Data
US 2019/0082089 A1 Mar. 14, 2019

(30) Foreign Application Priority Data
Sep. 14, 2017 (JP) .................. 2017-176453

(51) Int. Cl.
*H04N 5/232* (2006.01)
*H04N 5/225* (2006.01)
*G02B 26/10* (2006.01)
*G02B 27/01* (2006.01)
*H04N 13/204* (2018.01)

(52) U.S. Cl.
CPC .......... *H04N 5/2329* (2013.01); *G02B 26/10* (2013.01); *G02B 27/017* (2013.01); *H04N 5/2252* (2013.01); *H04N 5/2253* (2013.01); *H04N 5/2258* (2013.01); *H04N 5/23254* (2013.01); *H04N 13/204* (2018.05); *G02B 2027/0138* (2013.01); *G02B 2027/0178* (2013.01); *G02B 2027/0187* (2013.01)

(58) Field of Classification Search
CPC .. H04N 5/2329; H04N 13/204; H04N 5/2253; H04N 5/2258; H04N 5/23254; H04N 5/2252; H04N 13/296; H04N 13/239; H04N 13/344; G02B 27/017; G02B 26/10; G02B 2027/0138; G02B 2027/0187; G02B 2027/0178
See application file for complete search history.

(56) References Cited

U.S. PATENT DOCUMENTS

| | | | |
|---|---|---|---|
| 2005/0256675 A1 | 11/2005 | Kurata | |
| 2007/0242937 A1 | 10/2007 | Sano et al. | |
| 2012/0033098 A1* | 2/2012 | Matsuyama | ......... H04N 5/3532 348/222.1 |
| 2016/0004079 A1 | 1/2016 | Takano et al. | |
| 2016/0350974 A1* | 12/2016 | Hashimoto | ............... B60R 1/00 |
| 2016/0357017 A1 | 12/2016 | Nishidate et al. | |

FOREIGN PATENT DOCUMENTS

| | | | |
|---|---|---|---|
| JP | 2003-279882 A | 10/2003 | |
| JP | 2004-085476 A | 3/2004 | |
| JP | 2009-141717 A | 6/2009 | |
| JP | 2011-205215 A | 10/2011 | |

(Continued)

*Primary Examiner* — Padma Haliyur
(74) *Attorney, Agent, or Firm* — Oliff PLC (57) ABSTRACT

An electronic apparatus is configured to include an area sensor with a rolling shutter method and a detector configured to detect a change in a position of the area sensor, based on an inter-frame difference for each line in an image captured by the area sensor.

6 Claims, 7 Drawing Sheets

(56) References Cited

FOREIGN PATENT DOCUMENTS

| | | |
|---|---|---|
| JP | 4957851 B2 | 6/2012 |
| JP | 2012-169990 A | 9/2012 |
| JP | 2012-222374 A | 11/2012 |
| JP | 5428261 B2 | 2/2014 |
| JP | 2016-52114 A | 4/2016 |
| JP | 2016-66848 A | 4/2016 |
| JP | 2016-224823 A | 12/2016 |

\* cited by examiner

ELECTRONIC APPARATUS, MOTION SENSOR, POSITION CHANGE DETECTION PROGRAM, AND POSITION CHANGE DETECTION METHOD

The present application is based on and claims priority from JP Application Serial Number 2017-176453, filed Sep. 14, 2017, the disclosure of which is hereby incorporated by reference herein in its entirety.

BACKGROUND

1. Technical Field

The disclosure relates to an electronic apparatus, a motion sensor, a position change detection program, and a position change detection method.

2. Related Art

A technique for analyzing a position change in an image captured by an imaging device is known. For example, JP-A-2016-66848 discloses a configuration that extracts, by template matching, rectangular areas for detecting a motion vector, from images captured by an imaging device and that calculates the motion vector, based on a correlation value for the rectangular areas between frames.

In a configuration comparing frames in terms of a specific portion of an image as in the technique in JP-A-2016-66848, after a rectangular area in a certain frame is imaged, the rectangular area is compared to an area in another frame, and for further comparison, imaging of the rectangular area in the next frame needs to be completed. Therefore, a minimum period for comparison is a frame period.

SUMMARY

The disclosure enables a position change to be analyzed with a short period.

An electronic apparatus includes an area sensor with a rolling shutter method, and a detector configured to detect a change in a position of the area sensor, based on an inter-frame difference for each line in an image captured by the area sensor. This configuration allows a change in the position of the area sensor to be detected for each line and to be acquired during an imaging period for each line. Therefore, an electronic apparatus capable of analyzing a position change with a short period is provided.

Furthermore, the electronic apparatus may be configured to further include a display section displaying an object a position of which changes based on the change in the position of the area sensor. This configuration allows the position of the object displayed on the display section to be changed according to the change in the position of the area sensor.

Furthermore, a configuration may be adopted in which the change in the position of the object on the display section offsets the change in the position of the area sensor. This configuration allows the display section to display an image including an object appearing not to move in spite of movement of the area sensor.

Furthermore, the display section may be configured to display the image captured by the area sensor and the object superimposed on the image. This configuration allows the display section to display the object superimposed on the image captured by the area sensor, the position of the object changing according to the changing of position of the area sensor.

Furthermore, the area sensor may include a first area sensor fixed to a housing and a second area sensor fixed to the housing and having a main scanning direction coinciding with a direction orthogonal to a main scanning direction of the first area sensor. The detector may detect a change in a position of the housing in the main scanning direction of the first area sensor, based on the image captured by the first area sensor, and detect the change in the position of the housing in the main scanning direction of the second area sensor, based on the image captured by the second area sensor. This configuration enables a change in the position of the housing to be detected in the two orthogonal directions, based on changes in positions of the first and second area sensors, allowing a two-dimensional change in the position of the housing to be detected.

Furthermore, a motion sensor may be configured to include an area sensor with a rolling shutter method and an output unit configured to output an inter-frame difference for each line in an image captured by the area sensor. This configuration provides a motion sensor that outputs a change in a position of the area sensor, based on the inter-frame difference for each line, the motion sensor allowing a position change to be analyzed with a short period.

BRIEF DESCRIPTION OF THE DRAWINGS

Embodiments of the disclosure will be described with reference to the accompanying drawings, wherein like numbers reference like elements.

DESCRIPTION OF EXEMPLARY EMBODIMENTS

Several exemplary embodiments of the disclosure will hereinafter be described in accordance with the following order. The disclosure includes
(1) configuration of head mounted display,
(1-1) configuration of camera unit,
(1-2) configuration of display section,
(2) imaging processing,
(3) display processing, and
(4) other exemplary embodiments.

(1) Configuration of Head Mounted Display

Figure 1:
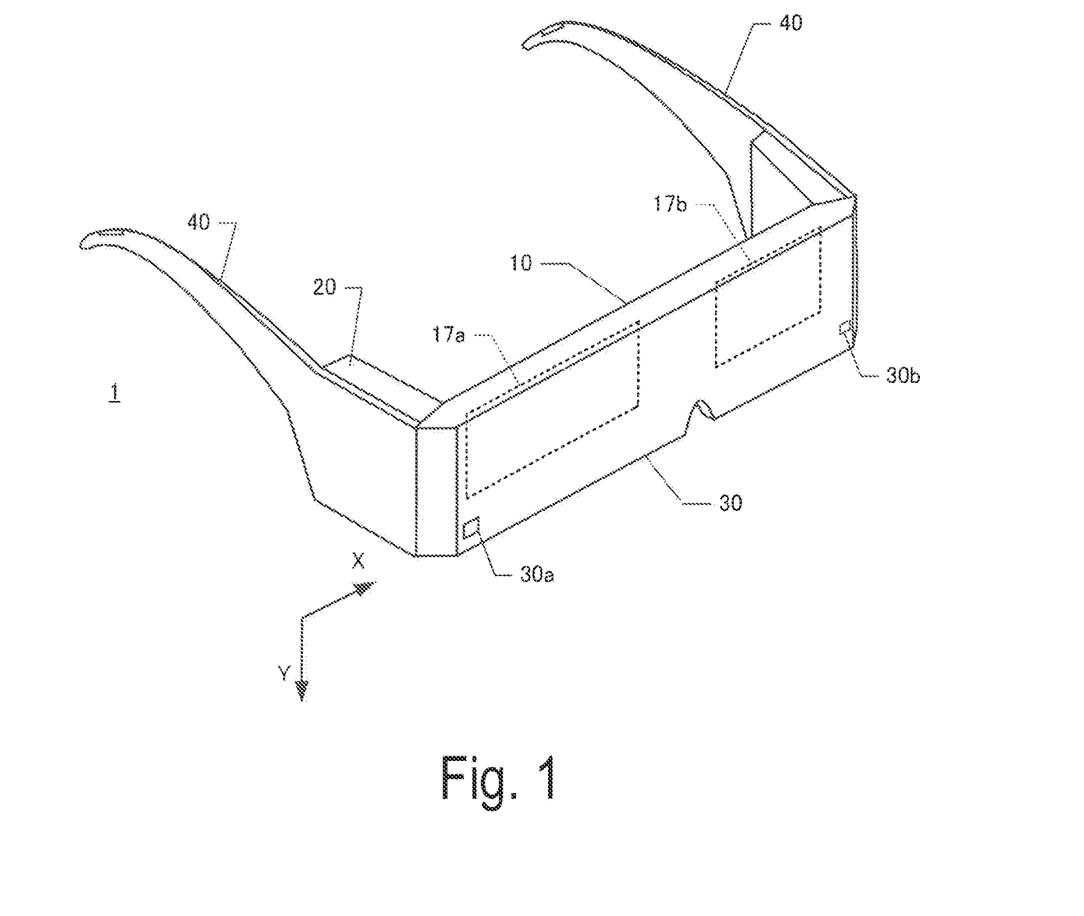
FIG. 1 is a diagram illustrating an appearance of a head mounted display.
Figure 2:
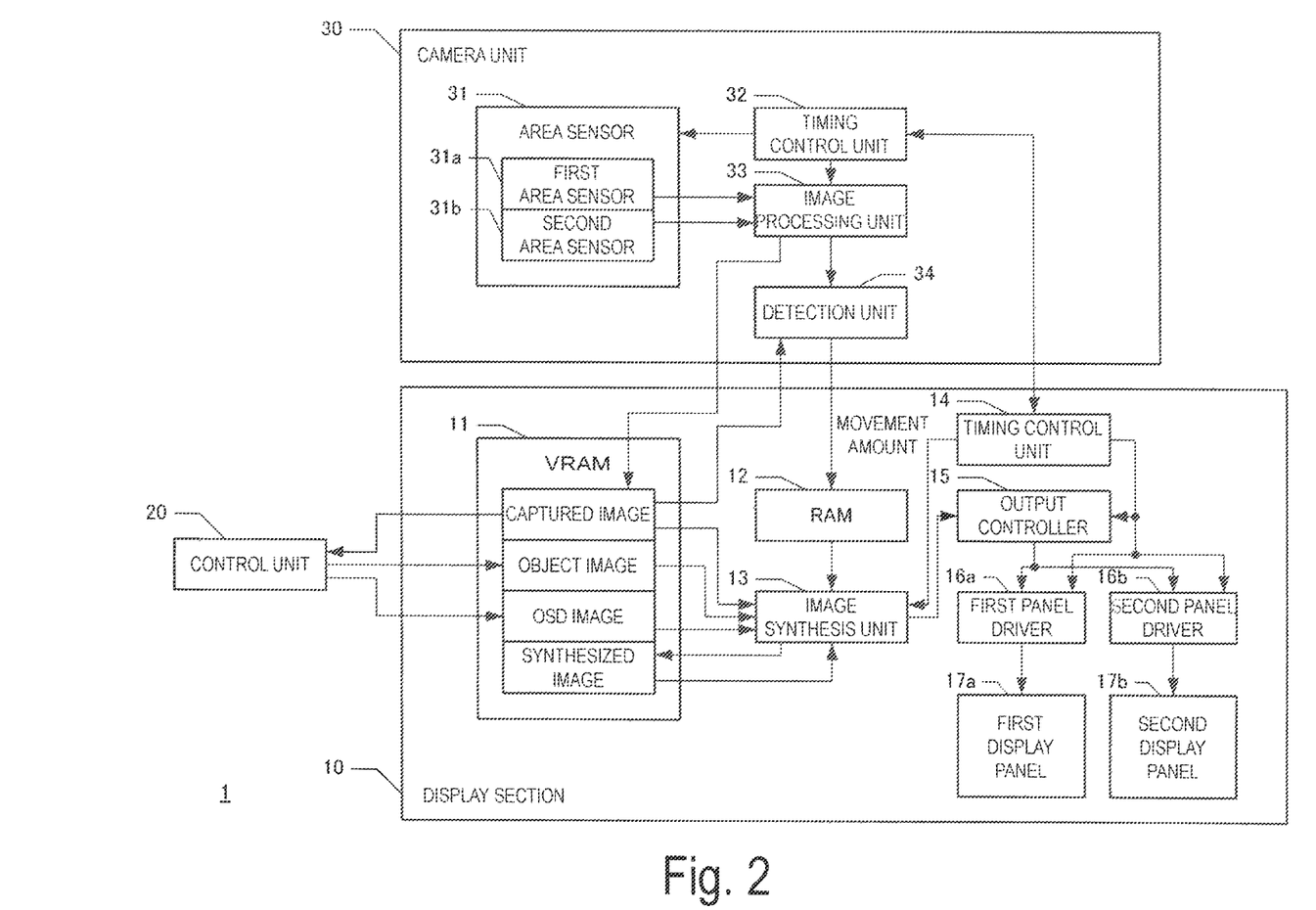
FIG. 2 is a block diagram illustrating a configuration of the head mounted display.

FIG. 1 is an explanatory diagram illustrating an external configuration of smart glasses serving as a Head Mounted Display (HMD) 1 according to the disclosure. FIG. 2 is a block diagram illustrating a configuration of the head-mounted display 1 in terms of functions. A head-mounted display 1 according to an exemplary embodiment is shaped like eyeglasses and includes a display section 10 and a camera unit 30 incorporated in respective portions of the head-mounted display 1 corresponding to lenses of the eyeglasses. The display section 10 includes a first display panel 17a and a second display panel 17b arranged at positions where the display panels 17a and 17b block the visual fields of the right and left eyes of a user, respectively, when the user wears the head-mounted display 1. Holding units 40 to be laid on the respective ears of the user are each coupled to the portion of the head-mounted display 1 corresponding to the lens of the eyeglass, and a control unit 20 is attached to each of the holding units 40.

(1-1) Configuration of Camera Unit

The camera unit 30 includes an area sensor 31, a timing control unit 32, an image processing unit 33, and a detector 34. The area sensor 31 includes an optical system, and a first area sensor 31a and a second area sensor 31b each including a CMOS sensor. The optical system is capable of forming an image on the CMOS sensor, by light from a body present in the direction of the visual field of the user with the head-mounted display 1 being worn. The CMOS sensor includes a color filter and a plurality of photo diodes in which charge corresponding to a light amount is stored for respective pixels through photoelectric conversion. The CMOS sensor is capable of outputting image data in colors depicting an image in the visual field.

The first area sensor 31a is a sensor for outputting image data in the visual field of the right eye, and the second area sensor 31b is a sensor for outputting image data in the visual field of the left eye. In FIG. 1, the first and second area sensors 31a and 31b are fixed to a right end and a left end, respectively, of a housing of the head-mounted display 1. However, fixed positions for the area sensors may be of course any position so long as the area sensors are capable of capturing images viewed by the right and left eyes. In the first area sensor 31a and the second area sensor 31b, the position of each pixel is defined by coordinates in an orthogonal coordinate system. A plurality of pixels arranged in a direction parallel to one coordinate axis form a line, and a plurality of lines are arranged in a direction parallel to the other coordinate axis. Herein, a direction parallel to the lines is referred to as a main scanning direction, and a direction perpendicular to the lines is referred to as a sub scanning direction. In an exemplary embodiment, the main scanning directions and the sub scanning directions of the first area sensor 31a and the second area sensor 31b are parallel to each other. The sub scanning direction corresponds to an up-down direction (a Y direction illustrated in FIG. 1), and the main scanning direction corresponds to a lateral direction (an X direction illustrated in FIG. 1).

In an exemplary embodiment, the first area sensor 31a and second area sensor 31b of the area sensor 31 perform operations in synchronism with various signals output by the timing control unit 32. In other words, the timing control unit 32 is capable of generating various signals based on a reference clock signal. In an exemplary embodiment, the various signals include a vertical synchronization signal ($SV_{sync}$) defining a period during which results of detection by the photo diodes for one frame (one screen configured with whole pixels in each area sensor) are read, a horizontal synchronization signal ($SH_{sync}$) defining a period during which results of detection by the photo diodes for one line are read, and a data clock signal (SDotclock) defining a read timing and the like for image data in each pixel. The area sensor 31 starts outputting output data for one frame in accordance with the vertical synchronization signal $SV_{sync}$, and reads output data indicative of the results of detection by the photo diodes corresponding to the pixels in one line of each of the first area sensor 31a and the second area sensor 31b in order, at each timing corresponding to the data clock signal SDotclock within the period defined by the horizontal synchronization signal $SH_{sync}$.

In the first area sensor 31a according to an exemplary embodiment, a phase of a horizontal synchronization signal $SH_{sync1}$ is slightly shifted on a line-by-line basis. Similarly, in the second area sensor 31b, a phase of a horizontal synchronization signal $SH_{sync2}$ is slightly shifted on a line-by-line basis. Specifically, in an exemplary embodiment, one line is exposed at an identical timing, but lines adjacent to each other in the sub scanning direction are exposed at different timings. Moreover, for the lines arranged starting with a sub scanning start line and ending with a sub scanning end line, a delay in an exposure start timing increases as a line number increases such that exposure is sequentially started at a timing varying with the line. In other words, the first area sensor 31a and the second area sensor 31b are each a CMOS sensor with a rolling shutter method. Hereinafter, when signals for the first area sensor 31a and the second area sensor 31b and signals for the first display panel 17a and the second display panel 17b are to be distinguished from one another, the signals are denoted by reference characters indicative of the signals, along with reference numerals 1, 2, and the like.

The image processing unit 33 utilizes a buffer memory, not illustrated in the drawings, to execute predefined image processing on imaged data sequentially output from the first area sensor 31a and the second area sensor 31b on a line-by-line basis. The image processing according to an exemplary embodiment is processing for generating, from images captured by the first area sensor 31a and the second area sensor 31b, images to be displayed on the first display panel 17a and the second display panel 17b, respectively located on the right and left sides. The image processing includes, for example, color reproduction, filtering, gamma correction, or resizing. The image processing may be of course any of various types of processing. The image processing is not limited to processing for display but may be, processing for detecting a change in the position of the area sensor, and the like.

Note that the resizing is processing for absorbing a difference in the number of pixels in effective imaging areas of the first area sensor 31a and the second area sensor 31b and the number of pixels in effective display areas of the first display panel 17a and the second display panel 17b to resize the captured images so as to allow the first display panel 17a and the second display panel 17b to display the images. Therefore, captured images output from the image processing unit 33 are images converted in such a manner as to be successfully displayed on the first display panel 17a and the second display panel 17b.

The processing in the image processing unit 33 is sequentially executed for the first area sensor 31a and the second area sensor 31b on a line-by-line basis, with resultant data output to a VRAM 11 provided in the display section 10 (the captured images in the VRAM 11 illustrated in FIG. 2). The captured image of at least one previous frame and an image being captured for the current frame are sequentially stored in the VRAM 11. On the other hand, in an exemplary embodiment, the resultant data processed by the image processing unit 33 is also output to the detector 34.

The detector 34 includes a function to detect a change in the position of the area sensor 31, based on an inter-frame difference for each line in the image captured by the area sensor 31. In an exemplary embodiment, both the first area sensor 31a and the second area sensor 31b are fixed to the housing of the head-mounted display 1, thus allowing a change in the position of the first area sensor 31a to be considered to be substantially the same as a change in the position of the second area sensor 31b. Thus, description is made in the exemplary embodiment on the assumption of a configuration in which data output from the first area sensor 31a and processed by the image processing unit 33 is output to the detector 34.

In an exemplary embodiment, the detector 34 detects a change in the position of the first area sensor 31a by determining movement amounts of a pattern in comparison areas defined for respective lines. In other words, in an exemplary embodiment, a subject to be imaged by the first area sensor 31a is assumed to be stationary (or substantially stationary), and the movement, between frames, of an image in the comparison areas is considered to be movement of the head-mounted display 1 (i.e., movement of the first area sensor 31a).

Figure 3:
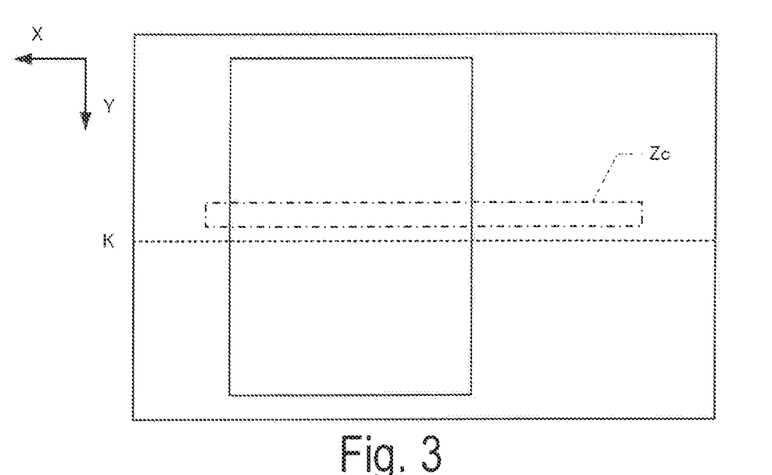
FIG. 3 is an explanatory diagram for describing processing for determining movement amounts of a pattern in a comparison area.
Figure 4:
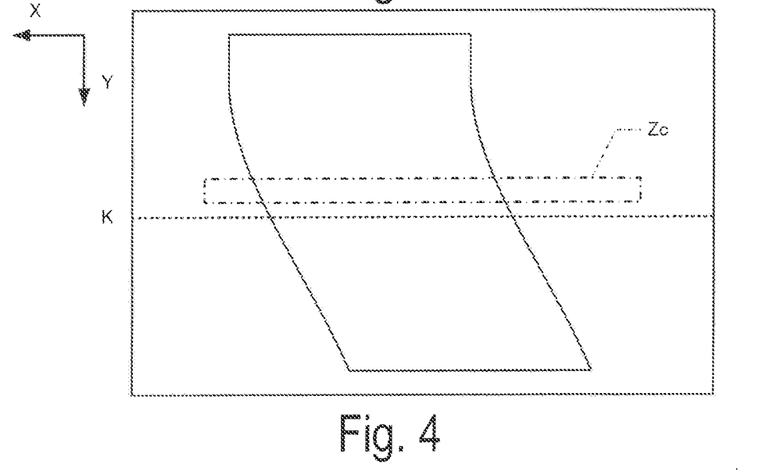
FIG. 4 is an explanatory diagram for describing processing for determining the movement amounts of the pattern in the comparison area.

FIGS. 3 to 6 are explanatory diagrams for describing processing for determining the movement amounts of the pattern in the comparison areas. FIG. 3 and FIG. 4 schematically illustrate the captured images of two consecutive frames. FIG. 3 and FIG. 4 illustrate an example where a rectangular body is present in the visual field of the first area sensor 31a. FIG. 3 schematically illustrates an image captured in a state that the first area sensor 31a is stationary. FIG. 4 schematically illustrates an image captured in a state that the first area sensor 31a is moving in an X-axis positive direction (a state that a user wearing the head-mounted display 1 rolls his/her head about a rolling axis of the head).

With the first area sensor 31a moving, the rolling shutter method sequentially delays the exposure start timing for each line to cause an image in which a change in the position resulting from the movement to be captured is reflected. In FIG. 4, an image is captured in a reflection of the movement of the first area sensor 31a in which the first area sensor 31a is stationary for a line in an imaging stage with an early exposure start timing and then starts moving, the image depicting a rectangular material distorted in an X-axis negative direction.

Figure 5:
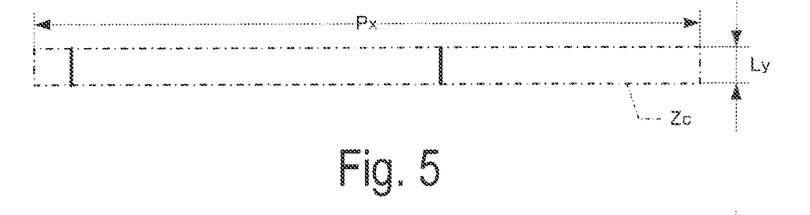
FIG. 5 is a diagram illustrating the comparison area.
Figure 6:
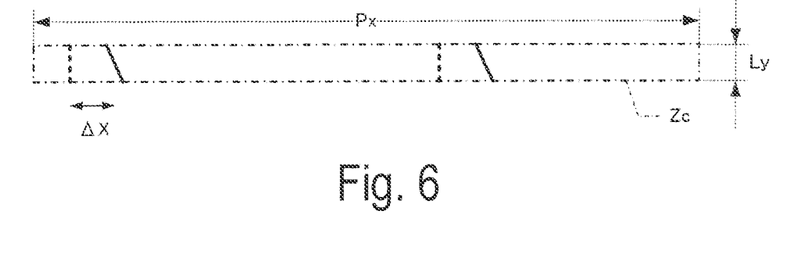
FIG. 6 is a diagram illustrating the comparison area.

The frame illustrated in FIG. 3 is referred to as the previous frame, and the frame illustrated in FIG. 4 is referred to as the current frame, herein. In this case, the K-th line of the first area sensor 31a is focused on and illustrated as a dashed line in each drawing. The comparison area is an area extracted from the captured image that is captured before the K-th line. In an exemplary embodiment, the comparison area is an area of Px pixels present in the center of an image of Ly lines located a predefined number of lines before the K-th line. In FIG. 3 and FIG. 4, a comparison area Zc is illustrated by an alternate long and short dash line. FIG. 5 and FIG. 6 illustrate the comparison area Zc extracted from FIG. 3 and FIG. 4, respectively.

The detector 34 includes a buffer memory, not illustrated in the drawings. When the image processing unit 33 completes outputting a captured image of the K-th line, the detector 34 refers to the buffer memory to acquire the captured image of the comparison area Zc at the K-th line in the current frame. The detector 34 also refers to the VRAM 11 to acquire the captured image of the comparison area Zc at the K-th line in the previous frame. In the examples illustrated in FIG. 5 and FIG. 6, FIG. 6 illustrates the captured image of the comparison area Zc at the K-th line in the current frame, and FIG. 5 illustrates the captured image of the comparison area Zc at the K-th line in the previous frame. Note that, in FIG. 6, a pattern of the captured image in the previous frame is illustrated by dashed lines for reference.

The detector 34 moves, in an X-axis direction and a Y-axis direction, the captured image of the comparison area Zc at the K-th line in the previous frame, and acquires a difference between gradation values for the image resulting from the movement and gradation values for the captured image of the comparison area Zc at the K-th line in the current frame. The detector 34 then acquires a movement amount $\Delta X$ in the X-axis direction and a movement amount $\Delta Y$ in the Y-axis direction in a case where the difference is minimum. In FIGS. 3 to 6, the first area sensor 31a is assumed to be moving in the X-axis positive direction. In this case, the detector 34 acquires the movement amount $\Delta X$ in the X-axis direction as a finite value and acquires the movement amount $\Delta Y$ In the Y-axis direction as 0, as illustrated in FIG. 6. Of course, in a case where the first area sensor 31a is moving in the Y-axis direction, the movement amount $\Delta Y$ is also a finite value.

Note that, although each of the movement amounts is expressed in units of pixels, the movement amount is indicative of the amount of the movement, between the frames, of the image in the comparison areas, and is thus directionally opposite to the corresponding movement amount of the head-mounted display 1 (the corresponding movement amount of the first area sensor 31a). The above-described movement amount may also be in units different from the units of the corresponding movement amount of the head-mounted display 1. However, both movement amounts are basically equivalent when the subject is stationary. Furthermore, processing for evaluating the inter-frame difference is not limited to the difference in gradation values as described above, and any of various types of processing may be executed. For example, a configuration in which, before comparison, processing such as edge detection or binarization is executed on the captured image in each comparison area and in which a difference between the processed images is evaluated, and the like may be adopted.

The detector 34 is capable of implementing the above-described processing using a plurality of lines. In an exemplary embodiment, the movement amount $\Delta X$ in the X-axis direction and the movement amount $\Delta Y$ in the Y-axis direction are acquired for all the lines of the first area sensor 31a. The detector 34 acquires the movement amounts $\Delta X$ and $\Delta Y$ of the first area sensor 31a in the X-axis direction and the Y-axis direction, respectively, for each line, and then records the movement amounts $\Delta X$ and $\Delta Y$ in a RAM 12 of the display section 10 in association with the line number.

As a result, the display section 10 is capable of referring to the movement amounts $\Delta X$ and $\Delta Y$ based on the line number or referring to the latest movement amounts $\Delta X$ and $\Delta Y$. Note that the comparison areas may be any areas for reference to acquire the inter-frame difference for the K-th line and that the size (the values of Ly and Px), position, or the like of the comparison areas is not limited. For example, Ly of 1 can be a configuration for analyzing the inter-frame difference in units of lines, and a configuration is assumed in which the comparison area includes the captured image of the K-th line or in which the comparison area at the K-th line is the captured image of the K-th line (i.e., Ly=1).

(1-2) Configuration of Display Section

The display section 10 includes the VRAM 11, the RAM 12, an image synthesis unit 13, a timing control unit 14, an output controller 15, a first panel driver 16a, a second panel driver 16b, the first display panel 17a, and the second display panel 17b. The VRAM 11 is a memory in which images displayed on the first display panel 17a and the second display panel 17b are recorded. In an exemplary embodiment, images that may be recorded in the VRAM 11 include a captured image output by the image processing unit 33 (the image converted for display), an object image superimposed on the captured image for Augmented Reality (AR) display, an OSD image superimposed on the captured image to communicate various types of information to the user, and a synthesized image resulting from synthesis of the above-described images.

Note that data of the object image and data of the OSD image are created in advance, and data of the object image to be displayed and data of the OSD image to be displayed are recorded in the VRAM 11 under the control of the control unit 20. The control unit 20 is capable of executing various types of processing such as control of the display section 10 and the camera unit 30, and control of outputs corresponding to inputs from an input section, not illustrated in the drawings. For the synthesis, the control unit 20 selects the object image and the OSD image and determines positions of the images. In an exemplary embodiment, the object image is displayed as AR, and thus, the control unit 20 determines a display position of the object image (the display position in a case where the first area sensor 31a is stationary), based on the captured image. The control unit 20 then records the object image in the VRAM 11 in association with the display position. In a case where the OSD image is not displayed, no data of the OSD image may be recorded.

The movement amounts ΔX and ΔY output by the detector 34 are recorded in the RAM 12. The image synthesis unit 13 executes processing for synthesizing, with each of the captured images from the first area sensor 31a and the second area sensor 31b, the object the position of which changes based on a change in the position of the first area sensor 31a. In an exemplary embodiment, the control unit 20 determines the display position of the object in a case where the change in the position of the first area sensor 31a is 0. In a case where the change in the position of the first area sensor 31a is not 0, the image synthesis unit 13 changes the position of the object with respect to the display position to offset the change in the position of the first area sensor 31a. In other words, assuming that the display position of the object is (DX, DY) in the case where the change in the position of the first area sensor 31a is 0, when the detector 34 detects the movement amounts ΔX and ΔY, the image synthesis unit 13 sets the display position of the object to (DX+ΔX, DY+ΔY).

When the display position of the object is corrected in a reflection of the change in the position of the first area sensor 31a, the image synthesis unit 13 synthesizes the captured image with the object image. The synthesis may reflect the corrected display position of the object and may be performed using any of various techniques. For example, the synthesis may be realized using a sprite function or the like. In a case of utilizing the sprite function, the image synthesis unit 13 determines the display position of the object image recorded in the VRAM 11 to be the corrected display position, and generates data of a synthesized image in which the object image is superimposed on the captured image for display.

Note that, in an exemplary embodiment, the captured image from the first area sensor 31a is displayed on the first display panel 17a and the captured image from the second area sensor 31b is displayed on the second display panel 17b. Thus, the captured image from the first area sensor 31a and the captured image from the second area sensor 31b are each recorded in the VRAM 11, and the image synthesis unit 13 synthesizes the object image with each of the captured images at the corrected display position of the object. In an exemplary embodiment, the above-described processing is sequentially executed on a line-by-line basis. Note that, in a case where OSD display is to be performed, the image synthesis unit 13 also executes processing for superimposing the OSD image on the captured image at a predefined position.

In an exemplary embodiment, the first display panel 17a and the second display panel 17b are Organic Light Emitting Diode (OLED) panels each provided with a plurality of pixels configured by providing a red, a green, and a blue (RGB) color filters for each white luminous body. Therefore, changing a light emission intensity of each luminous body enables multicolor display on each pixel. Also on the first display panel 17a and the second display panel 17b, the position of each pixel is defined by coordinates in the orthogonal coordinate system. Moreover, a line includes a plurality of pixels arranged in a direction parallel to one coordinate axis (in the example, the X axis), and a plurality of lines are arranged in a direction parallel to the other coordinate axis (in the example, the Y axis). Herein, a direction parallel to the lines is referred to as a main scanning direction, and a direction perpendicular to the lines is referred to as a sub scanning direction. One screen including whole pixels of each panel is referred to as one frame herein.

The first panel driver 16a and the second panel driver 16b output, to the first display panel 17a and the second display panel 17b, respectively, signals causing each pixel to emit light at a light emission intensity corresponding to data of the synthesized image. Each of the first display panel 17a and the second display panel 17b includes a main scanning direction driver and a sub scanning direction driver, not illustrated in the drawings. For display, in accordance with signals output from the first panel driver 16a and the second panel driver 16b, the main scanning direction driver controls a display timing for each pixel in each line, and the sub scanning direction driver drives the luminous body of each pixel in the line corresponding to the current display timing.

In other word, the first panel driver 16a and the second panel driver 16b are configured to output various signals for display on the first display panel 17a and the second display panel 17b, such as a vertical synchronization signal ($DV_{sync}$) defining a period for display of one frame, a horizontal synchronization signal ($DH_{sync}$) defining a period for display for one line, a data active signal ($DD_{active}$) defining a retrieval period for the data of the synthesized image within each line, a data clock signal (DDotclock) defining, e.g., a timing to retrieve the data of each pixel, and the data (Data) of each pixel.

The first display panel 17a starts displaying, in accordance with a vertical synchronization signal $DV_{sync1}$, the captured image that has been captured by the first area sensor 31a and generated by the image processing unit 33, and for display, drives display target pixels on each line of the first display panel 17a at a timing corresponding to a data clock signal DDotclock 1 within a period defined by a horizontal synchronization signal $DH_{sync1}$. The second display panel 17b starts displaying, in accordance with a vertical synchronization signal $DV_{sync2}$, a captured image that has been captured by the second area sensor 31b and generated by the image processing unit 33, and for display, drives display target pixels on each line of the second display panel 17b at a timing corresponding to a data clock signal DDotclock 2 within a period defined by a horizontal synchronization signal $DH_{sync2}$.

Note that the display section 10 includes the timing control unit 14 and that the timing control unit 14 is coupled to the timing control unit 32. Specifically, in a case where the image capturing in the camera unit 30 is synchronized with the display in the display section 10, the synchronization may be achieved by allowing a clock signal generated by at least one of the timing control unit 14 and the timing control unit 32 to be used by the other. Of course, in a case where the synchronization is not performed, the camera unit 30 and the display section 10 may be driven by independent clock signals.

As described above, the first display panel 17a and the second display panel 17b are capable of performing sequential display on a line-by-line basis. In an exemplary embodiment, since the first area sensor 31a and the second area sensor 31b are sensors each using a rolling shutter method, captured images used to display captured images of lines are generated at sequentially slightly delayed timings. In an exemplary embodiment, lines having been ready to be displayed are sequentially displayed without waiting for a captured image of one frame to be completely generated.

Specifically, based on the captured image of the K-th line, a change in the position of the first area sensor 31a is determined, the display position of the object is determined, and the synthesis of the captured image of the K-th line with the object image is completed. Then, the K-th line is displayed. Thus, the timing control unit 14 instructs the output controller 15 with a signal for instructing a timing of completion of the synthesis for the K-th line.

The output controller 15 receives the indication, and then provides the instruction to the image synthesis unit 13. The image synthesis unit 13 acquires the data of the synthesized image of the K-th line from the VRAM 11 and outputs the data to the output controller 15. The output controller 15 drives the first panel driver 16a, based on data of the K-th line generated based on the captured image from the first area sensor 31a, and drives the second panel driver 16b, based on data of the K-th line generated based on the captured image from the second area sensor 31b. As a result, each of the first display panel 17a and the second display panel 17b displays an image of the K-th line in which the object image is superimposed on the captured image.

Note that the signal indicating the timing of completion of the synthesis for the K-th line may be in various aspects. The signal may instruct a timing a given period after the first area sensor 31a and the second area sensor 31b start capturing images of the K-th line or a timing when the synthesis for the K-th line is completed, the timing being determined by the image synthesis unit 13. The given period in the above-described former case may be defined by, e.g., a fixed period longer than or equal to a period for the processing by the image processing unit 33 and/or the image synthesis unit 13. The timing in the above-described latter case is realized by, e.g., a configuration in which the image synthesis unit 13 or the like outputs a pulse signal to the timing control unit 14 or the output controller 15 in a case where the image synthesis unit 13 ends the synthesis for each line.

As described above, in an exemplary embodiment, a change in the position of the first area sensor 31a is detected for each line, and with the change in the position for each line reflected, the synthesis and display of the object are performed. Therefore, as in the example illustrated in FIG. 4, even in a case where a captured image is distorted as a result of movement of the first area sensor 31a, an object image is displayed in such a manner as to follow the distortion.

Figure 7:
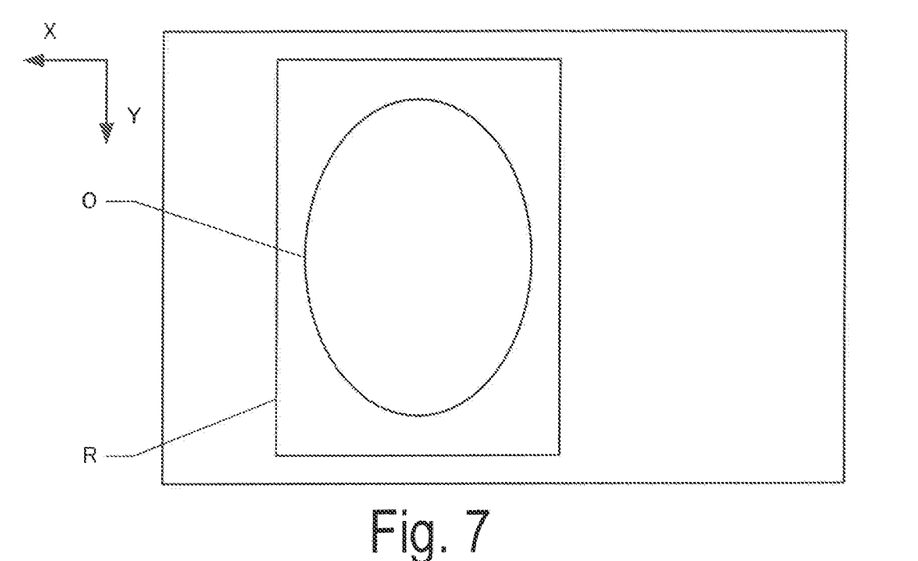
FIG. 7 is a diagram illustrating superimposed display of an object.
Figure 8:
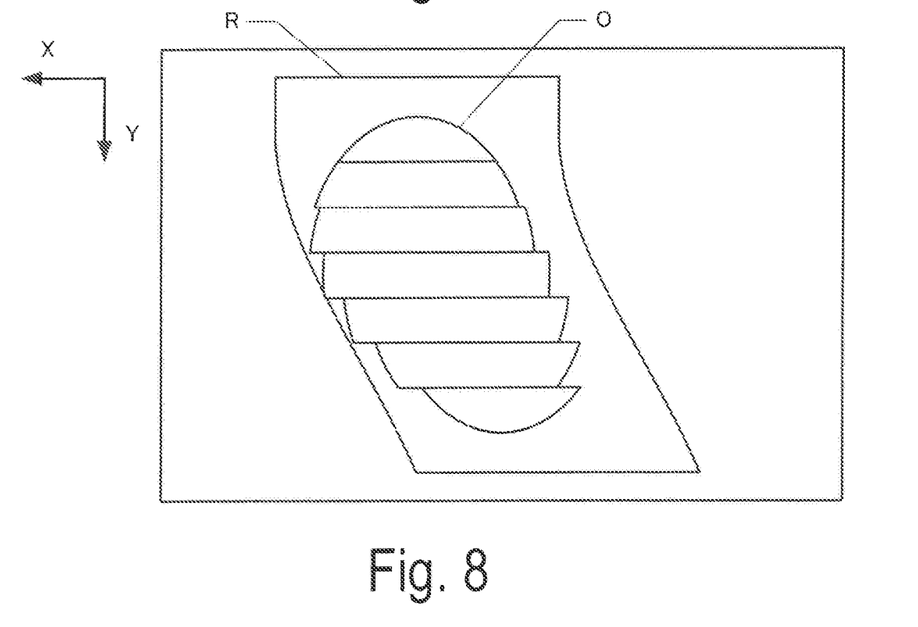
FIG. 8 is a diagram illustrating superimposed display of the object.

FIG. 7 and FIG. 8 illustrate an example of displayed images in which an elliptic object O is superimposed on a rectangular body R. FIG. 7 illustrates the first area sensor 31a which is stationary. Here, AR display is assumed in which an image of the object O is superimposed on an image of the body R, as illustrated in FIG. 7. For such AR display, the control unit 20 executes, e.g., processing for detecting, based on the captured image from the first area sensor 31a recorded in the VRAM 11, the position of the body in the captured image, by pattern matching and the like, and determining, based on the position of the body, the position of the center of gravity of the body and the like to be the display position of the object.

Each of the first area sensor 31a and the second area sensor 31b captures an image of the body R and the image processing unit 33 then converts the captured images. Then, data indicative of the resultant captured image is recorded in the VRAM 11. While the first area sensor 31a is stationary, a relative positional relationship between the body R and the first area sensor 31a remains unchanged, and thus, the position of the body R imaged at each line remains the same. Therefore, in the captured image converted for display, the shape of the body R is not distorted, as illustrated in FIG. 7. In this case, the inter-frame difference at each line is 0, and the detector 34 detects no change in the position of the first area sensor 31a. Therefore, the image synthesis unit 13 does not correct the display position of the object determined by the control unit 20. As a result, an image is generated in which the stationary object O is superimposed on the stationary body R, as illustrated in FIG. 7. The image is displayed on the first display panel 17a and the second display panel 17b.

On the other hand, while the first area sensor 31a is moving in the X-axis direction, the relative positional relationship between the body R and the first area sensor 31a changes, and thus, the position of the body R imaged at each line changes. Therefore, in the captured image converted for display, the shape of the body R is distorted as illustrated in FIG. 8. In this case, the inter-frame difference has a finite value (non-zero) at certain lines, and the detector 34 detects a change in the position of the first area sensor 31a. Therefore, the image synthesis unit 13 corrects the display position of the object determined by the control unit 20. As a result, an image is generated in which the object O is superimposed on the body R distorted as illustrated in FIG. 7, at a display position varying with the line. The image is displayed on the first display panel 17a and the second display panel 17b.

Note that FIG. 8 schematically illustrates that the object O is displayed in such a manner that the movement amounts of the object O vary with the line, and the object O is displayed in units of areas each having a certain width in the Y-axis direction. However, in an exemplary embodiment, the object O can be displayed at a display position varying with the line and can thus actually be more smoothly distorted.

Figure 9:
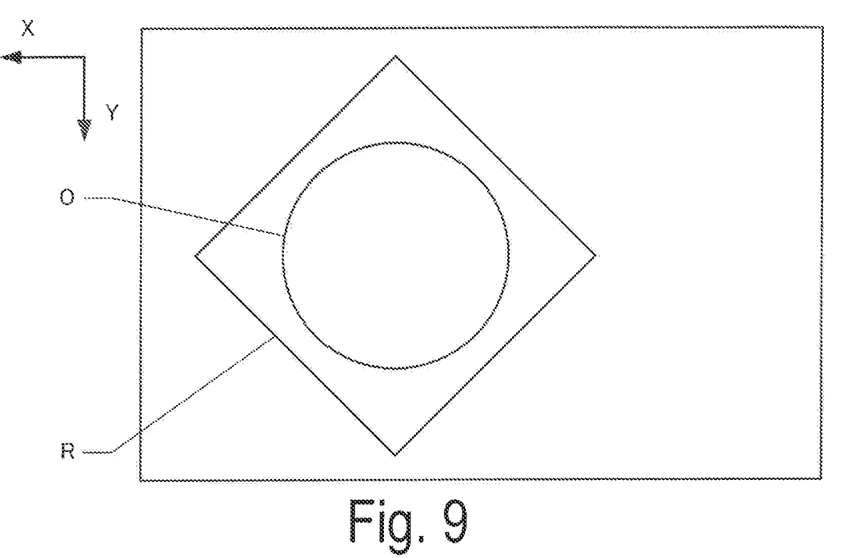
FIG. 9 is a diagram illustrating superimposed display of the object.
Figure 10:
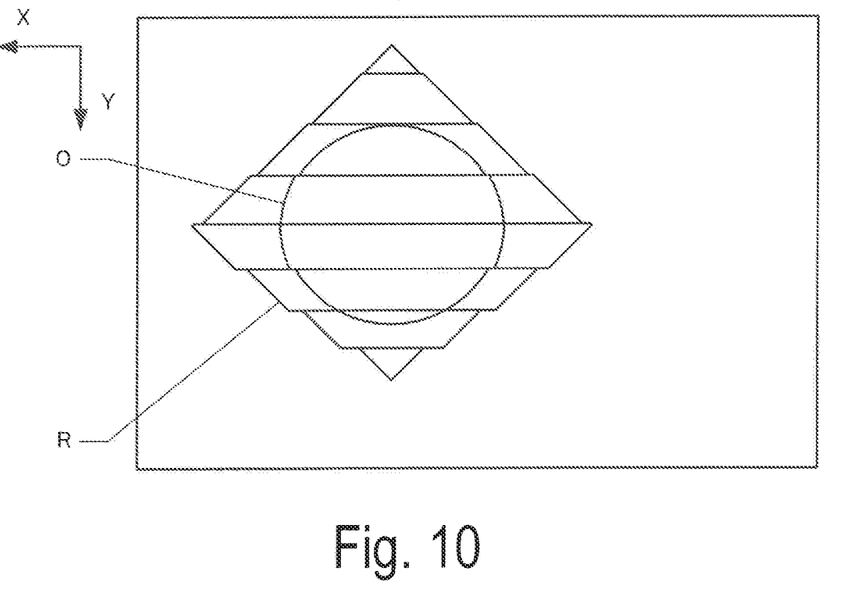
FIG. 10 is a diagram illustrating superimposed display of the object.

FIG. 9 and FIG. 10 illustrate examples of a displayed image in which a circular object O is superimposed on a square body R. FIG. 9 illustrates an example of a state where the first area sensor 31a is stationary, and FIG. 10 illustrates an example of a state where the first area sensor 31a is moving in the Y-axis direction. In a case where the first area sensor 31a is stationary, even when each of the first area sensor 31a and the second area sensor 31b captures an image by using the rolling shutter method, the images of the body R and the object O is prevented from being distorted as illustrated in FIG. 9.

On the other hand, when the first area sensor 31a is moving in the Y-axis positive direction, the exposure start timing is sequentially delayed at each line of each of the first area sensor 31a and the second area sensor 31b. Thus, the image of the body R is distorted in the Y-axis direction as illustrated in FIG. 10. In this case, the detector 34 acquires the movement amount ΔY in the Y-axis direction as a finite value (non-zero). Therefore, the image synthesis unit 13 corrects the display position of the object determined by the control unit 20. As a result, an image is generated in which the object O is superimposed on the body R distorted as illustrated in FIG. 10, at a display position varying with the line. The image is displayed on the first display panel 17a and the second display panel 17b.

Note that FIG. 10 schematically illustrates that the object O is displayed in such a manner that the movement amounts of the object O vary with the line, and the object O is displayed in units of areas each having a certain width in the Y-axis direction. However, in an exemplary embodiment, the object O may be displayed at a display position varying with the line and may thus actually be more smoothly distorted.

The above-described configuration allows a change in the position of the first area sensor 31a to be detected for each line and to be acquired during an imaging period for each line. Therefore, the head-mounted display 1 capable of analyzing a position change with a short period is provided.

The first area sensor 31a functions as a motion sensor detecting a change in the position of the head-mounted display 1 equipped with the first area sensor 31a. Another example of the motion sensor is a gyrosensor and the like. The gyrosensor detects an angular velocity with a period of several tens of milliseconds. On the other hand, in an exemplary embodiment, the position is detected with a line period. Therefore, for example, in a case of a sensor for 1280 dots (horizontal)×720 lines (vertical) (actually approximately 750 lines) is driven at 60 fps, the position is detected with a period of approximately $1/60 \times 1/750 = 22.2$ μs. Thus, compared to existing motion sensors, the first area sensor 31a is capable of much more accurately detecting the position.

Moreover, with a change in the position of the first area sensor 31a reflected, the change having been detected with a short period, the position of the object displayed on the display section 10 is changed according to the position of the first area sensor 31a. This configuration also allows the display section 10 to display an image including an object that appears as if not moving, although the first area sensor 31a moves. Furthermore, display is performed in such a manner as to avoid giving the impression that the object is delayed in reacting to movement of the head-mounted display 1.

(2) Imaging Processing

Figure 11:
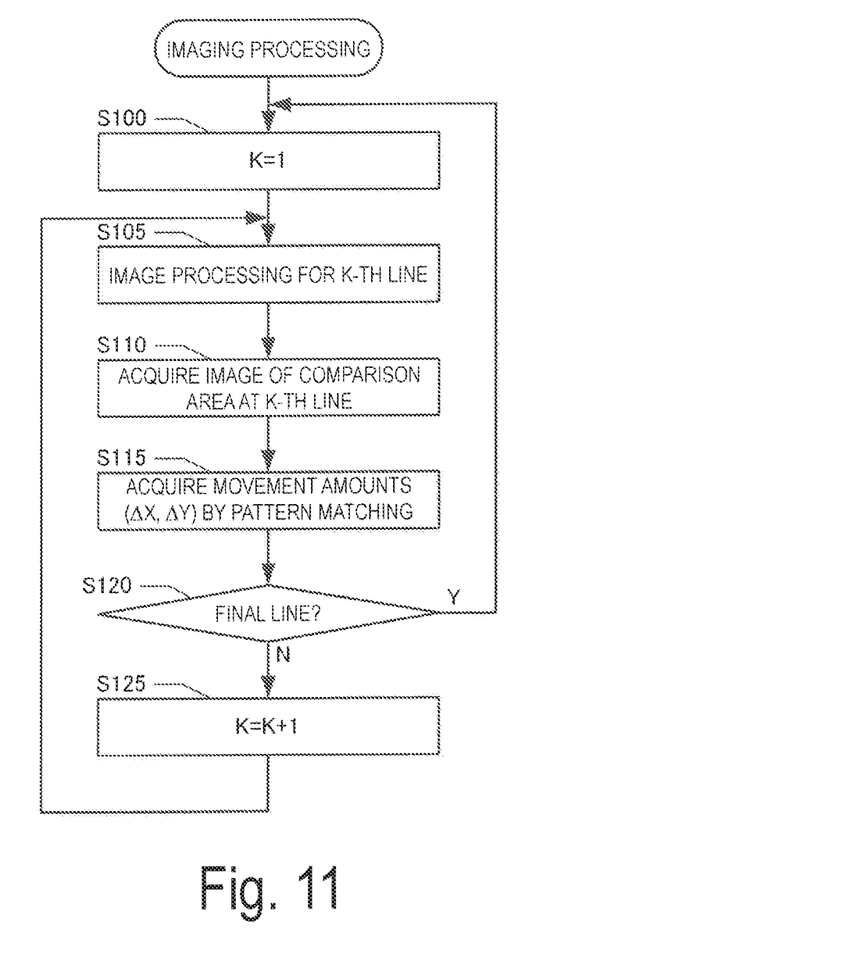
FIG. 11 is a flowchart of imaging processing.

Now, imaging processing executed by the camera unit 30 will be described with reference to a flowchart illustrated in FIG. 11. When the camera unit 30 starts capturing images in response to, e.g., an instruction from the control unit 20, the timing control unit 32 generates various signals such as the above-described vertical synchronization signals $SV_{sync1}$ and $SV_{sync2}$ and horizontal synchronization signals $SH_{sync1}$ and $SH_{sync2}$, based on the clock signal, and outputs the various signals to the first area sensor 31a and the second area sensor 31b at predefined timings. When the timing control unit 32 outputs the various signals at the predefined timings, the first area sensor 31a and the second area sensor 31b of the area sensor 31 capture images at the timings indicated by the various signals.

In other words, in each of the frames with a frame period defined by the vertical synchronization signals $SV_{sync1}$ and $SV_{sync2}$, each line is imaged with a period defined by the horizontal synchronization signals $SH_{sync1}$ and $SH_{sync2}$. As a result, the first area sensor 31a and the second area sensor 31b sequentially output the captured images on a line-by-line basis. While the first area sensor 31a and the second area sensor 31b are thus sequentially outputting images in accordance with the vertical synchronization signals $SV_{sync1}$ and $SV_{sync2}$, the horizontal synchronization signals $SH_{sync1}$ and $SH_{sync2}$, and the like, the image processing unit 33 first initializes a line number K to 1 (step S100). In other words, the image processing unit 33 initializes K to 1 in accordance with the first pulses of the vertical synchronization signals $SV_{sync1}$ and $SV_{sync2}$.

Next, the image processing unit 33 executes image processing for the K-th line (step S105). Specifically, when each of the first area sensor 31a and the second area sensor 31b provides an output for one line, the image processing unit 33 executes color reproduction, filtering, gamma correction, resizing, and the like on each line output. Performing step S105 converts each captured image into an image for display, and the image for display then recorded in the VRAM 11. The VRAM 11 holds at least the captured image of at least the previous frame. When data of captured images after conversion for the K-th line is stored in the VRAM 11, in a case where a captured image corresponding to the second frame before the current frame is present, the data of the K-th line in the second frame before the current frame is discarded. Of course, the timing to discard the data may vary depending on a capacity of the VRAM 11. For example, in a case where the VRAM 11 has a large capacity, when a captured image corresponding to the third frame before the current frame is present, the corresponding data may be discarded.

Then, the detector 34 acquires an image of the comparison area at the K-th line, based on the captured image from the first area sensor 31a (step S10). Specifically, the detector 34 refers to the VRAM 11 to acquire image data of an area of Px pixels present in the center of an image of Ly lines located a predefined number of lines before the K-th line in the previous frame (e.g., FIG. 5). The detector 34 also refers to the buffer memory provided in the detector 34 to acquire image data of an area of Px pixels present in the center of an image of Ly lines located a predefined number of lines before the K-th line in the current frame (e.g., FIG. 6).

Then, the detector 34 acquires the movement amounts (ΔX, ΔY) by pattern matching and outputs the movement amounts (step S115). Specifically, the detector 34 moves the image of the comparison area in the previous frame acquired in step S110, and acquires a difference between gradation values for the image resulting from the movement and gradation values for the image of the comparison area in the current frame. The movement is performed a plurality of times in such a manner that each moving operation involves a predefined number of steps and that the movement covers a predetermined movement range in the up-down direction and the lateral direction. Once the difference in gradation values is acquired for the entire movement range in the up-down direction and the lateral direction, the detector 34 outputs movement amounts (ΔX, ΔY) at which the difference is minimum, and records the movement amounts in the RAM 12 in association with the K-th line.

Note that, in a case where the value of K is not great enough to provide a comparison area with a predefined shape (in a case where the line is in an upper portion of the first area sensor 31a), the size and shape of the comparison area may be changed or the movement range within which the comparison area is moved to allow the difference to be calculated may be reduced. Furthermore, in a case where the captured image on which the image processing is performed in step S105 is the first frame and no previous frame data is present, steps S110 and S115 are skipped.

Next, the image processing unit 33 determines whether the line number K indicates the number of the final line (step S120). In a case where the line is not the final line, the image processing unit 33 increments K (step S125) and repeats step S105 and subsequent steps. In other words, the image processing unit 33 and the detector 34 repeat the respective processing for the next line. In a case where the line is determined in step S120 to be the final line, the image processing unit 33 repeats step S100 and subsequent steps. In other words, the image processing unit 33 and the detector 34 repeat the respective processing for the next frame.

(3) Display Processing

Figure 12:
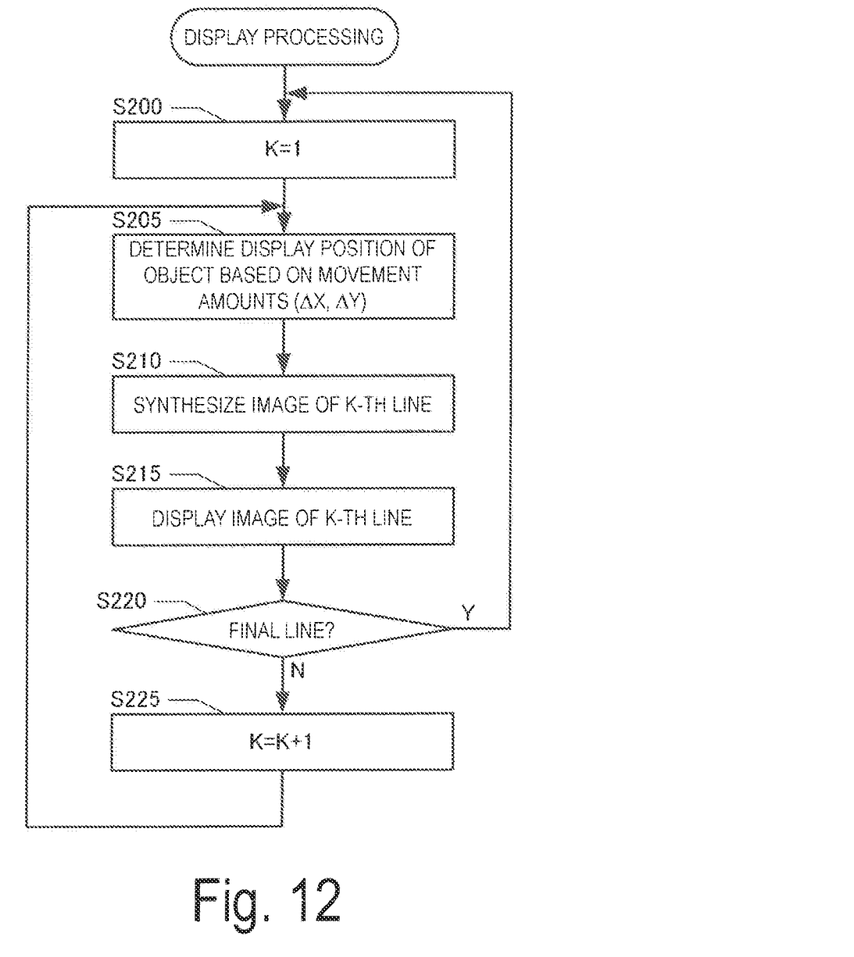
FIG. 12 is a flowchart of display processing.

Now, display processing executed by the display section 10 will be described with reference to a flowchart illustrated in FIG. 12. When the camera unit 30 starts capturing images, the timing control unit 14 generates various signals such as the above-described vertical synchronization signals $DV_{sync1}$ and $DV_{sync2}$ and horizontal synchronization signals $DH_{sync1}$ and $DH_{sync2}$ in synchronism with the output signals from the timing control unit 32, and outputs the various signals at predefined timings. When the timing control unit 14 outputs the various signals at the predefined timings, the first panel driver 16a and the second panel driver 16b display images on the first display panel 17a and the second display panel 17b, respectively, at the timings indicated by the various signals.

In other words, in each of the frames with a frame period defined by the vertical synchronization signals $DV_{sync1}$ and $DV_{sync2}$, each line is displayed with a period defined by the horizontal synchronization signals $DH_{sync1}$ and $DH_{sync2}$. As a result, images in which the object is superimposed on each of the images captured by the first area sensor 31a and the second area sensor 31b are sequentially displayed on the first display panel 17a and the second display panel 17b, respectively, on a line-by-line basis.

In order to display the images on the first display panel 17a and the second display panel 17b at timings corresponding to the vertical synchronization signals $DV_{sync1}$ and $DV_{sync2}$, the horizontal synchronization signals $DH_{sync1}$ and $DH_{sync2}$, and the like, the image synthesis unit 13 first initializes the line number K to 1 (step S200). In other words, the image synthesis unit 13 initializes K to 1 in accordance with the first pulses of the vertical synchronization signals $DV_{sync1}$ and $DV_{sync2}$.

The image synthesis unit 13 then determines the display position of the object, based on the movement amounts (ΔX, ΔY) (step S205). In other words, the image synthesis unit 13 determines the display position of the object at the K-th line to be (DX+ΔX, DY+ΔY), based on the display position (DX, DY) of the object in a case where the first area sensor 31a is stationary.

Next, the image synthesis unit 13 synthesizes an image of the K-th line (step S210). Specifically, the image synthesis unit 13 refers to the VRAM 11 to extract the data of the K-th line in the image of the current frame captured by each of the first area sensor 31a and the second area sensor 31b. The image synthesis unit 13 also extracts the data of the K-th line in the object image resulting from movement of the display position. Then, to make the object visible, the data of the K-th line in the object image is superimposed on the data of the K-th line in the captured image of the current frame captured by each of the first area sensor 31a and the second area sensor 31b. The synthesized image resulting from the superimposition is recorded in the VRAM 11.

Next, each of the first display panel 17a and the second display panel 17b displays the image of the K-th line (step S215). Specifically, when the timing control unit 14 outputs the horizontal synchronization signals $DH_{sync1}$ and $DH_{sync2}$ and the like for K-th line display, the output controller 15 acquires the synthesized image of the K-th line via the image synthesis unit 13, and outputs, to the first panel driver 16a, the synthesized image generated based on the captured image from the first area sensor 31a. The output controller 15 also outputs, to the second panel driver 16b, the synthesized image generated based on the captured image from the second area sensor 31b.

As a result, the object image is superimposed on the image captured by the first area sensor 31a, and an image in which the object image moves in response to a change in the position of the first area sensor 31a is displayed on the first display panel 17a. Moreover, the object image is superimposed on the image captured by the second area sensor 31b, and an image in which the object image moves in response to a change in the position of the second area sensor 31b is displayed on the second display panel 17b.

Next, the image synthesis unit 13 determines whether the line number K indicates the number of the final line (step S220). In a case where the line is not final line, the image synthesis unit 13 increments K (step S225) and repeats step S205 and subsequent steps. In other words, the image synthesis unit 13 repeats the processing for the next line. In a case where the line is determined in step S220 to be the final line, the image synthesis unit 13 repeats step S200 and subsequent steps. In other words, the image synthesis unit 13 repeats the processing for the next frame.

(4) Other Exemplary Embodiments

The above-described exemplary embodiments are examples for implementing the disclosure. Various other exemplary embodiments may be adopted so long as a change in the position of the area sensor is detected for each line utilizing the delay in the exposure start time for each line of the area sensor with a rolling shutter method.

For example, the first display panel 17a and the second display panel 17b are not limited to OLEDs, but may be liquid crystal displays or displays projecting images. The display projecting images may be a screen projection display or a see-through display that projects images on transmissive screens. This configuration may be, for example, the configuration illustrated in FIG. 1 and including transmissive screens corresponding to the lenses and projection units integrated into the holding units laid on the user's ears to allow images to be projected on the screens via light guide plates. For the transmissive screens, display of images captured by the first area sensor 31a and the second area sensor 31b may be omitted, and instead, an object may be superimposed on scenery viewed through the screens.

Furthermore, the detector 34 detects a change in the position of each of the first area sensor 31a and the second area sensor 31b, based on the captured image resized by the image processing unit 33, i.e., the captured image converted to have a number of pixels displayed on the first display panel 17a and the second display panel 17b. However, the change in the position may be detected before the resizing. In this case, a correspondence relationship between non-resized pixels and resized pixels is clarified in advance, and a change in the position detected based on the non-resized image is converted into a change in the position resulting from the resizing, based on the correspondence relationship. Then, the resized image is synthesized with an object.

The area sensor may be any area sensor with a rolling shutter method. In other words, any area sensor may be used that involves an exposure timing varying with the line and that is capable of analyzing a change in the position of the area sensor at a timing varying with the line by acquiring an inter-frame difference, based on images of the respective lines.

The detector may be a unit capable of detecting a change in the position of the area sensor, based on an inter-frame difference for each line in an image captured by the area sensor. In other words, the detector may be a unit capable of acquiring the inter-frame differences for a plurality of lines constituting the area sensor and detecting a change in the position of the area sensor, based on the inter-frame differences.

Note that the change in the position of the area sensor is a change in the position in a real space where the electronic apparatus and the area sensor are present and that the configuration may be a configuration capable of detecting the presence of a change in at least one direction and not capable of detecting the amount of change in the position in two directions as in one exemplary embodiment described above.

The inter-frame difference may be acquired at least for each line, and for a certain line of a plurality of lines constituting the area sensor, a difference between images captured in different frames may be acquired as the inter-frame difference. The inter-frame difference is a difference in units of frames and may be preferably a difference between one frame and the previous frame. However, a difference between one frame and a frame before the previous frame may be utilized for analysis.

Moreover, the inter-frame difference may be defined to allow acquisition of a change in the position of the area sensor. The inter-frame difference may be defined by the movement amounts of a pattern in each comparison area corresponding to each line as described above, may be defined by a movement distance and the like of an edge present in each line, or may be defined by the best matching movement amounts in a case where the image of each line is moved in a line direction. Of course, in a case where a change in the position of the area sensor is detected based on the inter-frame difference, various types of image processing, for example, binarization, sharpening, smoothing may be executed.

Note that the inter-frame difference reflects a change between frames of an image of the subject and a change in the position of the area sensor is a change in the relative position between the subject and the area sensor. In other words, both the following cases are conceivable: the case where the position of the subject changes and the case where the position of the area sensor changes. However, on the assumption that the position of the subject remains unchanged (or remains substantially unchanged), the change may be determined to be a change in the position of the area sensor.

In a case where the position of the subject (e.g., scenery) is assumed to remain unchanged, a configuration may be adopted in which mobile bodies with changeable positions are excluded from the image so as to specify an analysis target for the inter-frame difference or a change in the position of the area sensor may be detected in a case where the absolute position of the area sensor is determined to have changed, based on images or the like. Moreover, the lines for which the inter-frame difference is determined may be all or some of the lines provided in the area sensor. For example, the inter-frame difference may be determined for lines in which an edge has been detected.

The position of the area sensor may be considered to change according to any change occurring in the area sensor. A change in a translational direction, a change in a rotating direction, or both may be considered to be the change in the position.

The object superimposed on the images may have any shape, size, and color, and any of various objects may be adopted according to the purpose of the display on the display section. The position of the object may be changed based on a change in the position of the area sensor. Any of various configurations may be adopted other than a configuration in which the object is displayed in such a manner as to appear stationary without depending on the position of the area sensor as described above. For example, to indicate that the object is moving, a change in the position of the area sensor may be used (e.g., for movement in the same direction, a position change speed of the area sensor is reduced from a position change speed of the object).

The display section may be provided in the electronic apparatus, and various aspects of the display section may be assumed. Specifically, the electronic apparatus may have any of various configurations other than the above-described configuration of the head mounted display. The electronic apparatus may be any of various types of electronic apparatus such as a portable terminal and a robot. For the portable terminal, the electronic apparatus may be configured such that the area sensor is arranged on a surface of a housing of the portable terminal and that the display section serving as a flat panel display is mounted on a back surface of the surface. For the robot, the electronic apparatus may be configured such that the area sensor is mounted on a component (e.g., a component shaped like a head of a human being) fixed to an arm or a base of the robot. In this case, the display section may be omitted or mounted on a robot control apparatus or the like.

The configuration in which a change in the position of the object in the display section offsets a change in the position of the area sensor may be any configuration in which the object is displayed on the display section in such a manner as to appear stationary without depending on movement of the area sensor. To offset a change in the position of the area sensor, the object may be recognized for a viewer to be stationary in a case where the area sensor moves. The change in the position of the area sensor may be strictly offset or a certain amount of error may be permitted.

Note that, although in one exemplary embodiment described above, the main scanning directions of the first area sensor 31*a* and the second area sensor 31*b* are parallel to each other, the main scanning directions may be differently oriented. For example, in the configuration illustrated in FIG. 2, the sub scanning direction of the first area sensor 31*a* may coincide with the up-down direction (the Y direction illustrated in FIG. 1), the main scanning direction of the first area sensor 31*a* may coincide with the lateral direction (the X direction illustrated in FIG. 1), the sub scanning direction of the second area sensor 31*b* may coincide with the lateral direction (the X direction illustrated in FIG. 1), and the main scanning direction of the second area sensor 31*b* may coincide with the up-down direction (the Y direction illustrated in FIG. 1).

In the configuration in which the first area sensor 31*a* and the second area sensor 31*b* are thus fixed to the housing such that the main scanning directions of the first and second area sensors 31*a* and 31*b* are orthogonal to each other, a change in the position of each sensor or the head-mounted display 1 may be detected by utilizing outputs from the first and second area sensors 31*a* and 31*b*. Specifically, in the configuration illustrated in FIG. 2, the detector 34 acquires (movement amount in main scanning direction, movement amount in sub scanning direction)=($\Delta X1$, $\Delta Y1$) for each line, based on the output from the first area sensor 31*a*, and acquires (movement amount in main scanning direction, movement amount in sub scanning direction)=($\Delta X2$, $\Delta Y2$) for each line, based on the output from the second area sensor 31*b*. Note that, the main scanning directions of the first area sensor 31*a* and the second area sensor 31*b* are orthogonal to each other, and thus $\Delta X1$ and $\Delta X2$ are movement amounts in different directions, and $\Delta X1$ and $\Delta Y2$ are movement amounts in the same direction.

In the case where the main scanning directions of the first area sensor 31*a* and the second area sensor 31*b* are orthogonal to each other in this way, each sensor detects the movement amounts in the X direction and the Y direction. The image synthesis unit 13 is capable of determining an arbitrary value based on the movement amount(s) to be a change in the position of the head-mounted display 1.

However, for each sensor, the accuracy of the position may vary with the movement direction. In other words, each sensor captures images by using the rolling shutter method, and thus in a case where the body moves in the sub scanning direction, the body is imaged in such a manner as to appear larger or smaller in size in the sub scanning direction. On the other hand, in a case where the body moves in the main scanning direction, the body may be imaged at a position varying with the line, but is prevented from appearing larger or smaller in size in the main scanning direction due to the use of the rolling shutter method.

Therefore, in calculation of the inter-frame difference, a change in the position in the main scanning direction is calculated more accurately than a change in the position in the sub scanning direction. Thus, the detector 34 is capable of accurately detecting a two-dimensional change in the position by detecting a change ($\Delta X1$) in the position of the housing in the main scanning direction, based on the image captured by the first area sensor 31*a* and detecting a change ($\Delta X2$) in the position of the housing in the main scanning direction, based on the image captured by the second area sensor 31*b*.

Furthermore, any of various other types of processing may be adopted as the processing in the detector 34. For example, the detector 34 may normally detect a change in the position of the housing based on the output from one of the first area sensor 31*a* and the second area sensor 31*b*, and in a case where the detection accuracy of the position change acquired from the output from the first area sensor 31*a* is estimated to decrease, the detector 34 may also use the output from the second area sensor 31*b*. The detection accuracy of the position change may decrease, e.g., in a case where the amount of the position change is greater than or equal to a reference value (the amount is estimated to indicate noise) and a case where the differences between the movement amounts detected by the first area sensor 31*a* and the movement amounts detected by the second area sensor 31*b* (($|\Delta X1-\Delta Y2|$, $|\Delta X2-\Delta Y1|$)) are greater than or equal to thresholds. An example of a configuration using the output from the second area sensor 31*b* includes a configuration for which the movement amounts are considered to be ($\Delta X1$, $\Delta X2$).

Note that a change in the position of the first area sensor 31*a* or the head-mounted display 1 often corresponds to rolling motion of the wearer's head and infrequently to completely two-dimensional displacement. Thus, the main scanning directions of the first area sensor and the second area sensor may be parallel to two main movement directions instead of being strictly orthogonal to each other.

Note that, when the first area sensor 31*a* and the second area sensor 31*b* are fixed to the housing, the area sensors may be fixed to the housing in such a manner that the area sensors do not move relative to the housing. Thus, a change in the position of each area sensor can be considered to be substantially the same as a change in the position of the housing. Note that the first area sensor 31*a* and the second area sensor 31*b* may be preferably fixed to the housing such that the area sensors are capable of imaging the same subject. Moreover, a change in the position of each area sensor may be acquired based on the inter-frame difference for images of the same subject. Of course, three or more area sensors may be provided, and three area sensors may detect a change in the position of the area sensors (housing) in a three-dimensional space.

Furthermore, the configuration for detecting a change in the position of the first area sensor 31*a* is considered to be a motion sensor. For example, a configuration (in the example illustrated in FIG. 2, the timing control unit 32, the image processing unit 33, the VRAM 11, and the detector 34) outputting the movement amounts ($\Delta X$, $\Delta Y$) of the first area sensor 31*a*, based on the captured image from the first area sensor 31*a* can be considered to be an output unit. A motion sensor itself including the output unit may be commercially distributed.

Furthermore, a technique for detecting a change in the position of the area sensor, based on the inter-frame difference for each line as in the disclosure is applicable as a program or method. Moreover, the apparatus, program, and method as described above may be realized as a single apparatus or realized by utilizing common components in an apparatus including combined functions. The disclosure includes various aspects.

What is claimed is:

1. An electronic apparatus comprising:
    a first area sensor with a rolling shutter method;
    a second area sensor with a rolling shutter method; and
    a detector configured to detect each of a change in a position of the first area sensor, based on an inter-frame difference for each line in an image captured by the first area sensor, and a change in a position of the second area sensor, based on an inter-frame difference for each line in an image captured by the second area sensor,
    wherein the first area sensor and the second area sensor are disposed in respective positions so as to image a same subject,
    the first area sensor is fixed to a housing,
    the second area sensor is fixed to the housing and has a main scanning direction coinciding with a direction orthogonal to a main scanning direction of the first area sensor, and
    the detector detects a change in a position of the housing in the main scanning direction of the first area sensor, based on the image captured by the first area sensor, and detects the change in the position of the housing in the main scanning direction of the second area sensor, based on the image captured by the second area sensor.

2. The electronic apparatus according to claim 1, further comprising:
a display section configured to display an object a position of which changes based on the change in the position of at least the first area sensor and the second area sensor.

3. The electronic apparatus according to claim 2, wherein the change in the position of the object on the display section offsets the change in the position of at least the first area sensor and the second area sensor.

4. The electronic apparatus according to claim 2, wherein the display section is configured to display the image captured by at least the first area sensor and the second area sensor and the object superimposed on the image.

5. A motion sensor comprising:
a first area sensor with a rolling shutter method;
a second sensor with a rolling shutter method; and
an output unit configured to output an inter-frame difference for each line in an image captured by the first area sensor, and to output an inter-frame difference for each line in an image captured by the second area sensor,
wherein the first area sensor and the second area sensor are disposed in respective positions so as to image a same subject,
the first area sensor is fixed to a housing,
the second area sensor is fixed to the housing and has a main scanning direction coinciding with a direction orthogonal to a main scanning direction of the first area sensor, and
the output unit outputs a change in a position of the housing in the main scanning direction of the first area sensor, based on the image captured by the first direction of the second area sensor, based on the image captured by the second area sensor.

6. A position change detection method comprising:
detecting a change in a position of a first area sensor with a rolling shutter method, based on an inter-frame difference for each line in an image captured by the first area sensor; and
detecting a change in a position of a second area sensor with a rolling shutter method, based on an inter-frame difference for each line in an image captured by the second area sensor,
wherein the first area sensor and the second area sensor are disposed in respective positions so as to image a same subject,
the first area sensor is fixed to a housing,
the second area sensor is fixed to the housing and has a main scanning direction coinciding with a direction orthogonal to a main scanning direction of the first area sensor,
detecting the change in the position of the first sensor includes detecting. a change in a position of the housing in the main scanning direction of the first area sensor, based on the image captured by the first area sensor, and
detecting the change in the position of the second sensor includes detecting the change in the position of the housing in the main scanning direction of the second area sensor, based on the image captured by the second area sensor.

* * * * *